United States Patent
Baur et al.

(10) Patent No.: US 9,518,614 B2
(45) Date of Patent: Dec. 13, 2016

(54) DEVICE FOR RELEASABLY CONNECTING TWO COMPONENT PARTS WITH AT LEAST ONE SHAFT

(71) Applicant: ZF FRIEDRICHSHAFEN AG, Friedrichshafen (DE)

(72) Inventors: Markus Baur, Wolfegg (DE); Stefan Albrecht, Leutkirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/500,448

(22) Filed: Sep. 29, 2014

(65) Prior Publication Data
US 2015/0107954 A1     Apr. 23, 2015

(30) Foreign Application Priority Data

Oct. 17, 2013  (DE) .......................... 10 2013 221 130

(51) Int. Cl.
| | | |
|---|---|---|
| F16D 11/14 | (2006.01) | |
| F16D 27/00 | (2006.01) | |
| F16D 27/118 | (2006.01) | |
| F16D 21/04 | (2006.01) | |
| F16D 11/00 | (2006.01) | |

(52) U.S. Cl.
CPC ............... *F16D 11/14* (2013.01); *F16D 21/04* (2013.01); *F16D 27/004* (2013.01); *F16D 27/118* (2013.01); *F16D 2011/002* (2013.01)

(58) Field of Classification Search
CPC .............. F16D 27/118; F16D 2011/002; F16D 2011/004; F16D 2500/10462; F16D 11/14

USPC ........................................................ 192/69.91
See application file for complete search history.

(56) References Cited

U.S. PATENT DOCUMENTS

| | | | | |
|---|---|---|---|---|
| 2,433,428 A | * | 12/1947 | Carnagua | F16D 23/10 192/114 R |
| 5,908,080 A | * | 6/1999 | Bigley | B60K 17/3515 180/247 |
| 7,370,742 B2 | * | 5/2008 | Rudle | F16D 11/14 192/48.91 |
| 2003/0116397 A1 | * | 6/2003 | Ima | F16D 23/06 192/48.91 |
| 2008/0022792 A1 | * | 1/2008 | Robinson | B60K 25/02 74/15.8 |
| 2013/0334000 A1 | * | 12/2013 | Gerauer | F16D 11/14 192/69.7 |

* cited by examiner

*Primary Examiner* — Mark Manley
(74) *Attorney, Agent, or Firm* — Brinks Gilson & Lione

(57) ABSTRACT

A device used to achieve a releasable connection between two components and at least one shaft on which the components are rotatably mounted. A switching element that is mounted on the shaft can be coupled to one of the components in a non-rotatable fashion by relative motion in the axial direction of the shaft between the components and the switching element. Toothing profiles of the components each comprise at least two spaced-apart teeth rows. A toothing profile of the switching element is provided with at least three spaced-apart rows of teeth, of which at least two teeth rows of the switching element can be brought into a position where they overlap/engage with the two teeth rows of the first component and also where this happens for at least two of the three teeth rows of the switching element with the two teeth rows of the second component.

18 Claims, 5 Drawing Sheets

DEVICE FOR RELEASABLY CONNECTING TWO COMPONENT PARTS WITH AT LEAST ONE SHAFT

PRIORITY STATEMENT

This application claims the benefit of German Patent Application DE 10 2013 221 130.9, filed Oct. 17, 2013, and incorporates the German Patent Application by reference herein in its entirety.

FIELD

The present disclosure relates to a device used to achieve a releasable connection between two components and at least one shaft.

BACKGROUND

The statements in this section merely provide background information related to the present disclosure and may not constitute prior art.

A device used for the rotationally fixed connection of at least two construction elements, or components, with two switching element halves is recognized in DE 10 2010 039 445 A1, which can be operated given at least slightly tooth-like elements with surrounding coupling provisions to achieve a positive-locking connection. One switching element half surrounds the other switching element half at least partially, while the switching element halves can either be connected with each other in a rotationally fixed manner by a relative motion between the switching element halves in the area of the coupling provisions or be guidable out of the positive-locking engagement. The coupling provision of one switching element half is provided with an inner section facing the other switching element half while the coupling provision of the other switching element half is similarly fitted with an exterior section facing the interior section of the other half. Additionally, the coupling provisions of the switching element halves are provided with at least two mutually spaced apart rows of teeth in the direction of the relative motion, which can be made to engage the respectively spaced apart rows of teeth of the other switching element half.

Disadvantageously, the device itself is characterized by undesirably high space requirements and a large travel range has to be provided in the area of the actuator intended for actuation, which can only be achieved with actuator systems that are structurally complex and characterized by high production costs.

The disclosure concerned here, therefore, aims to provide a solution for the releasable connection of two components with at least one shaft in an inexpensive and space-saving manner.

SUMMARY

The present disclosure provides a device used for the releasable connection of two components and at least one shaft on which the components are mounted in a rotatable manner. A switching element fitted to the shaft in a non-rotatable manner can be coupled in a non-rotatable manner with one of the components using a relative motion in the axial direction of the shaft between the components and the switching element. The first component is coupled to the shaft via the switch element in a non-rotatable manner in the first operating state of the switching element and the components, while the second component is rotatably mounted on the shaft. The second component is coupled to the shaft in a non-rotatable manner given the second operating state of the switching element and the components, while the first component is rotatably mounted on the shaft. The toothing profile of the components can be brought into engagement with a toothing profile of the switching element if one toothing profile of the components overlaps with the toothing profile of the switching element. The operative connection between one of the components and the switching element can be released if the toothing profile of the component and the toothing profile of the switching element no longer overlap.

In accordance with the present disclosure, the toothing profiles of the components each comprise at least two spaced-apart rows of teeth. The toothing profile of the switching element is provided with at least three spaced-apart rows of teeth, of which two rows of teeth of the switching element must be capable of engaging with the two teeth rows of the first component. The same applies to two rows of teeth of the switching element and the two teeth rows of the second component.

Due to the components being fitted with multiple rows of teeth and the switching element fitted with multiple rows of teeth as well, the device has a small space requirement for the rotationally fixed connection of the two components with the shaft. The cancellation of the engagement between the shaft and the two components is possible with a small axial switching distance.

Additionally, the device in accordance with the present disclosure can be operated by merely a single actuator, which means that the installation space requirements and associated costs are lowered in comparison to a device in accordance with the prior art, which comprises at least two actuator devices. Furthermore, the travel range necessary to switch the connection between the components and the shaft can also be implemented using an electro-magnetic actuator.

The advantageous arrangement of at least three rows of teeth on the switching element offers the possibility of creating a connection between the middle row of teeth of the switching element toothing profile with the first component in the first operating state, as well as a connection with the toothing profile of the second component in the second operating state. The switching element therefore creates a positive-locking connection between the first component and the shaft in the first operating state or the first switching position, while it creates an operative connection between the second component and the shaft in the second operating state of the switching element and the components via the middle row of teeth.

Given an advantageous embodiment of the device in accordance with the present disclosure, the distances between the tooth rows of the component toothing profiles and the distances between the tooth rows of the switching element toothing profiles are matched to one another in such a way that a relative motion between the components and the switching element originating from the first operating state in the direction of the second operating state causes an intermediate operating state to be passed at which the toothing profiles of the components have left the overlapping position with the toothing profile of the switching element and neither the first nor the second component are connected to the shaft in a non-rotatable manner. This ensures in a structurally simple and space-saving fashion that, given the usage of a preferably two-stage and multi-row claw interlocking system at the corresponding position of the switching element and/or the claw, one of the components (for example a cogwheel) is connected with the shaft in a positive-locking manner. A purposeful and proficient arrangement of the teeth achieves a so-called "idle state" between the first operating state (or a first switching state of a claw switching element) and a second operating state (or a second switching state of the claw). It is additionally possible to reduce the stroke to be provided by an actuating device, such as an electromagnetic actuator, to a minimum.

The previously described arrangement of distances between the rows of teeth of the toothing profiles of the components and the distances between the rows of teeth of the switching element makes it possible to provide a so-called "neutral state" between the two switching positions of the switching elements in a space-saving manner and requiring little effort in order to ensure that both components are never simultaneously connected to the shaft via the switching element in a non-rotatable manner. This is particularly advantageous if the components are designed as cogwheels that rotate at different rotational speeds depending on the activated operating state.

To provide an easy to manufacture embodiment of the device in accordance with the present disclosure, the toothing profiles of the components and the toothing profile of the switching element are arranged on corresponding diameter areas in a radial direction.

If the toothing profile of the first component and a corresponding first area of the switching element toothing profile and the toothing profile of a second component and a corresponding second area of the switching element toothing profile are arranged on deviating diameter areas of the components and the switching element in the radial direction, it is possible to adapt the device to existing installation spaces in a simpler manner and therefore it is easy to implement it into well-known systems with little effort.

In the most space-saving, in the axial direction, embodiment of the device in accordance with the present disclosure, the toothing profiles of the components in the axial direction of the shaft are at least partially adjacent. However, given an embodiment of the device in accordance with the present disclosure that is characterized by low space requirements in the axial direction, the toothing profiles of the components are at least partially encompassed in the radial direction by an area of the switching element provided with a toothing profile.

If the second component is rotatably mounted on the first component, which is in turn rotatably mounted on the shaft, the device in accordance with the present disclosure features a low space requirement in the axial direction.

The switching element is arranged on the shaft in the axial direction between the first stop and a second stop in a sliding manner given a structurally simple, cost-saving embodiment of the device in accordance with the present disclosure. The first stop for the switching element is provided in the area of the shaft in an easy to mount manner as a further development of the device in accordance with the present disclosure.

If the second stop for the switching element is provided in the area of a component, which is directly mounted on the shaft in a rotatable fashion, then the device in accordance with the present disclosure is designed in a structurally simple manner and can be operated with little power loss if a component is directly mounted on the shaft via the switching element. This results from the fact that the switching element and the component rotate with the same speed if the operating state of the component is activated and the switching element is positioned on the second stop of the component without a speed difference.

To provide an economically manufacturable embodiment of the device in accordance with the present disclosure, the switching element can be brought to the first operating state by an actuator and/or the switching element can be switched to the second operating state by the spring force exercised by a spring mechanism.

The actuator may comprise an electromagnet, as well as a permanent magnet. The electromagnet increases the magnetic field of the permanent magnet in the case of positive current flow, in which case the switching element can be brought to the first operating state by the actuator in opposition to the spring force exercised by the spring mechanism. The electromagnet weakens the magnetic field of the permanent magnet in the case of negative current flow, in which case the switching element can be brought to the second operating state by the spring force exercised by the spring mechanism in opposition to the magnetic force of the actuator. Accordingly, the device in accordance with the present disclosure can be operated requiring only small amounts of actuating effort.

Additionally, the switching element can be kept at the first operating state by the permanent magnet in a de-energized condition without requiring any additional power input until a corresponding request to move the switching element to the second operating state exists. The switching element remains in the second operating state even without active powering of the electromagnet due to the fact that the switching element can be moved to and kept at the second operating state by the spring mechanism without requiring any additional force.

The characteristics stated in the patent claims as well as the characteristics indicated in the following design examples for a device in accordance with the present disclosure are each by themselves or in custom combination capable of further developing the device in accordance with the present disclosure. The respective combinations of characteristics do not constitute a restriction regarding the further development of the device in accordance with the present disclosure, but are merely used for exemplary purposes.

Additional advantages and advantageous embodiments of the device in accordance with the present disclosure result from the patent claims and the design examples described in the following with reference to the drawing, while the same reference signs are used in the description of the different design examples for components that are identical in both construction and function in order to improve clarity.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
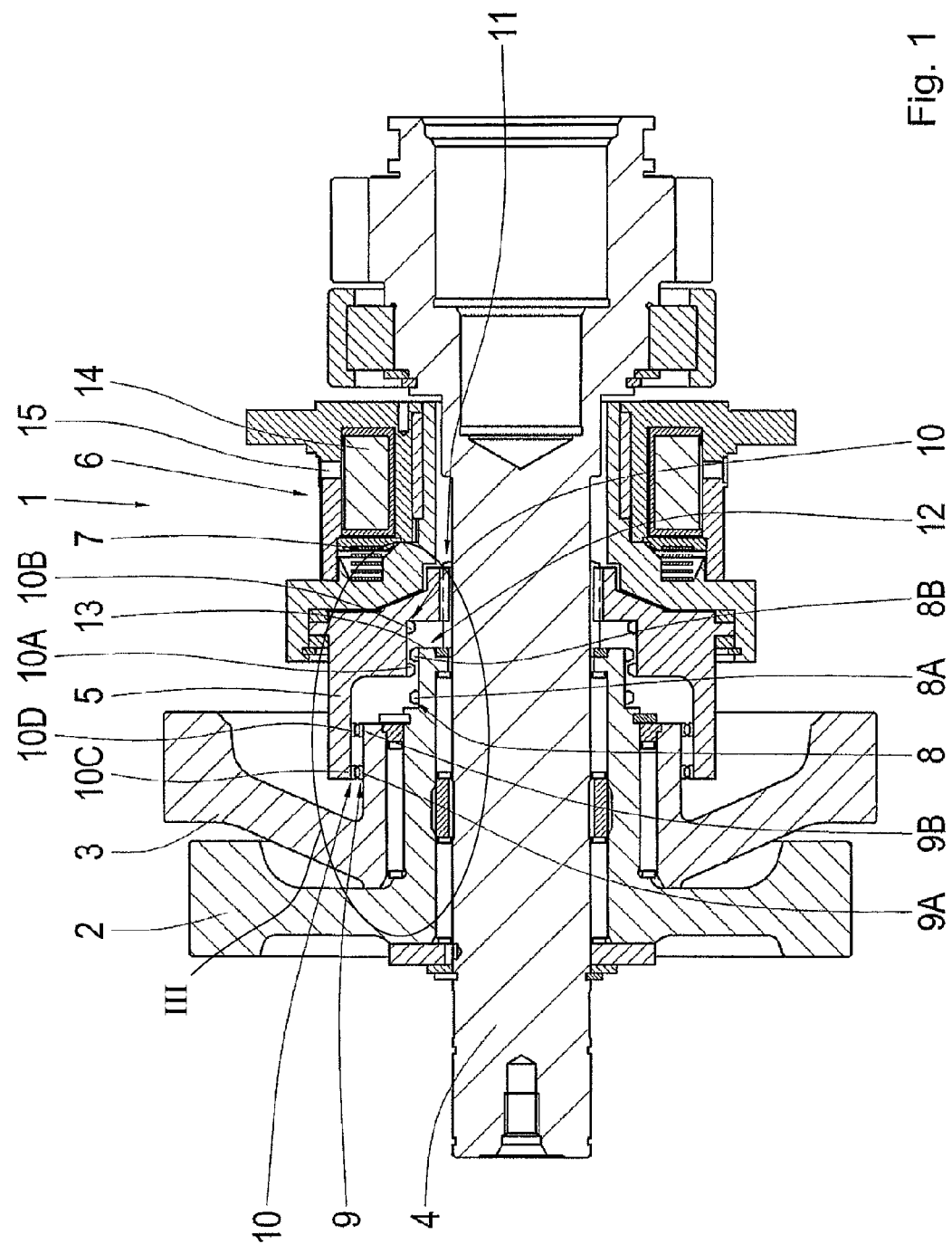
FIG. 1—A schematic longitudinal profile view of a first embodiment of the device in the first operating state of a switching element and with two components that can be connected to a shaft via the switching element.

The drawings described herein are for illustration purposes only and are not intended to limit the scope of the present disclosure in any way.

DETAILED DESCRIPTION OF EXAMPLE EMBODIMENTS

The following description is merely exemplary in nature and is not intended to limit the present disclosure, application, or uses. It should be understood that throughout the drawings, corresponding reference numerals indicate like or corresponding parts and features.

FIG. 1 shows a schematic profile view of device 1 used to establish a releasable connection between two components 2 and 3 (cogwheels in this case) and a shaft 4. The components 2 and 3 are rotatably mounted on shaft 4. Switching element 5 is mounted on shaft 4 in a non-rotatable manner and can be coupled to one of the two components 2 or 3 by a relative motion in the axial direction of shaft 4 between components 2, 3 and switching element 5. Switching element 5, which is arranged opposite to the components 2 and 3 positioned axially on the shaft, can be moved in the axial direction of shaft 4 by actuator 6 and a spring mechanism 7 (the scope of which will be described later). The second component 3 is rotatably mounted on the first component 2 in a space-saving manner and the first component 2 is, in turn, rotatably mounted on shaft 4. The switching element 5 is arranged in a slidable manner in the axial direction of shaft 4 between the first stop 11 and a second stop 12 on shaft 4. The first stop 11 for the switching element 5 is provided in the area of shaft 4 and the second stop 12 for the switching element 5 is provided in the area of a front surface 13 of the first component 2, which is rotatably mounted directly on shaft 4, facing the switching element. This ensures that when the switching element 5 is positioned at the second stop 12 or at front surface 13 of the first component 2, and the first component 2 is connected with shaft 4 by switching element 5, there is no speed difference between switching element 5 and the first component 2, ensuring that no friction loss can result in the area between switching element 5 and the first component 2.

Figure 2:
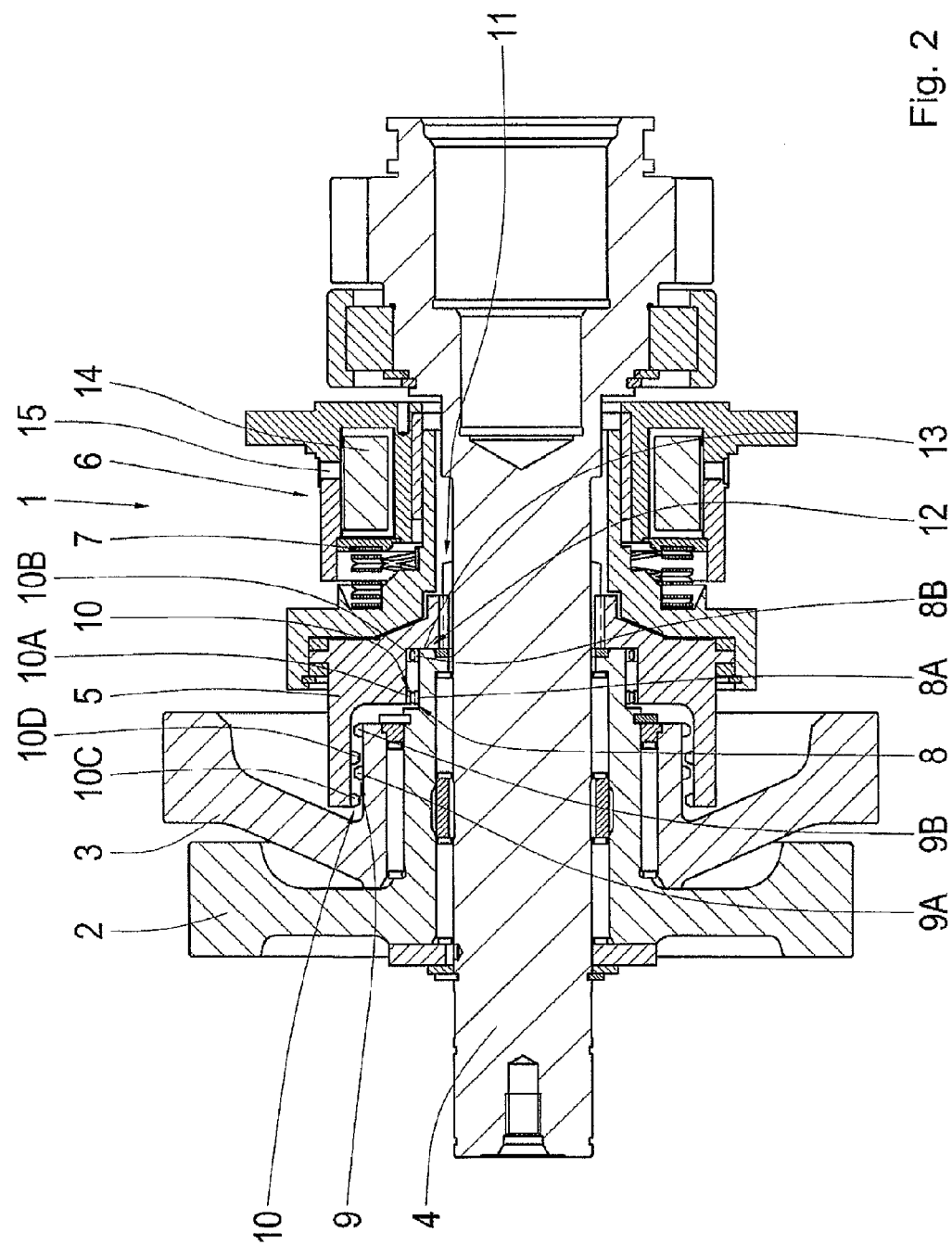
FIG. 2—A representation of the first embodiment of the device corresponding to FIG. 1 with the switching element and the two components in the second operating state.

In the first operating state of the switching element 5 shown in FIG. 2 and/or in the first switching position of switching element 5 and the two components 2 and 3, the first component 2 is coupled to shaft 4 in a non-rotatable manner via switching element 5, while the second component 3 is rotatably mounted on shaft 4. In contrast, in a second operating state shown in FIG. 1 of the switching element 5 and/or in a second axial switching position of switching element 5 and the components 2 and 3, the second component 3 is coupled with shaft 4 in a non-rotatable manner via switching element 5 and the first component 2 is rotatably mounted on shaft 4 in a second operating state.

The components 2 and 3 can each be brought into engagement with a toothing profile 10 of the switching element 5 in the area of toothing profiles 8 and 9 of components 2 or 3, if one toothing profile 8 or 9 overlaps with toothing profile 10 of switching element 5. The operative connection between one of the components 2 or 3 and switching element 5 is released if the toothing profile 8 or 9 of the components 2 or 3 and the toothing profile 10 of switching element 5 no longer overlap.

Figure 3:
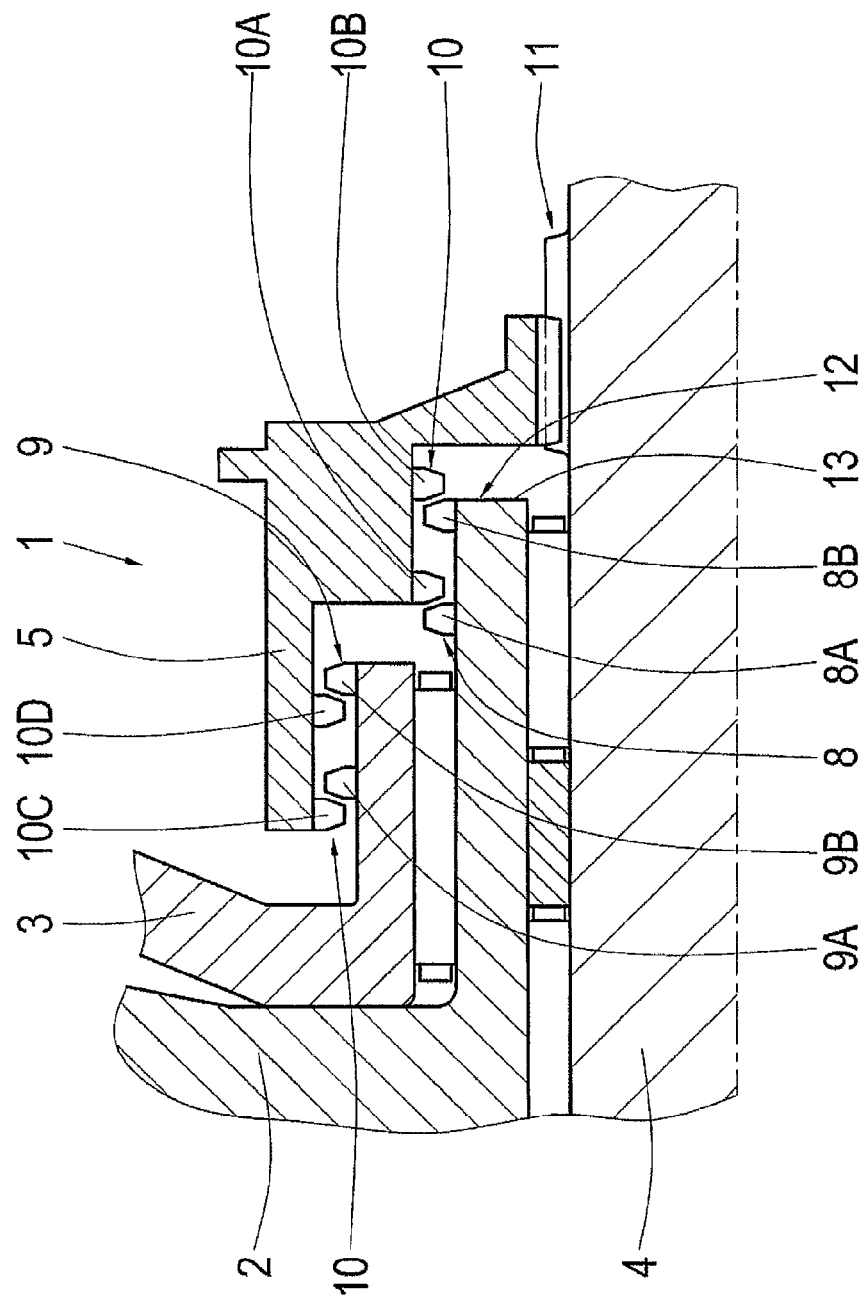
FIG. 3—An enlarged representation of area "III" (indicated as part of FIG. 1) with the switching element and the two components in an intermediate operating state.

The toothing profiles 8 and 9 of components 2 and 3 comprise the spaced-apart teeth rows 8A, 8B and/or 9A, 9B represented in greater detail as part of FIG. 3, while toothing profile 10 of switching element 5 is provided with four spaced-apart teeth rows 10A to 10D in the embodiment of device 1 as shown in FIG. 3. The teeth rows 8A and 8B of toothing profile 8 of the first component 2 and the teeth rows 9A and 9B of toothing profile 9 of the second component 3, as well as the teeth rows 10A to 10D of the switching element 5, are spaced apart in the axial direction. In this regard, both teeth rows 10A and 10B of switching element 5 overlap with the two teeth rows 8A and 8B of toothing profile 8 of the first component 2 in the first operating state of switching element 5 and the two teeth rows 10C and 10D of toothing profile 10 overlap with teeth rows 9A and 9B of toothing profile 9 of the second component 3 in the second operating state of switching element 5.

The axial distances between teeth rows 8A, 8B and 9A, 9B of toothing profile 8 and 9 of components 2 and 3 and the axial distances between teeth rows 10A to 10D of toothing profile 10 of switching element 5 are matched in such a way that a relative motion between components 2 and 3 and the switching element 5 originating from the operating state shown in FIG. 1 and in the direction of the second operating state shown in FIG. 2 causes an intermediate operating state of switching element 5 shown in FIG. 3 to be passed. At the intermediate operating state the toothing profiles 8 and 9 of components 2 and 3 no longer overlap with toothing profile 10 of switching element 5 and neither the first component 2 nor the second component 3 are connected with shaft 4 in a non-rotatable manner.

Actuator 6 comprises an electromagnet 14 and a permanent magnet 15. Given a positive current flow, the electromagnet 14 amplifies the magnetic field of permanent magnet 15 in such a way that switching element 5 is moved to the first operating state or the first axial switching state by actuator 6 in opposition to the spring force exercised by spring mechanism 7, at which point the first component 2 is connected to shaft 4 via switching element 5 in a non-rotatable manner. A negative current flow causes the electromagnet 14 to weaken the magnetic field of the permanent magnet 15. This causes the switching element 5 to be moved to the second operating state by the spring force of spring mechanism 7 in opposition to the magnetic force of actuator 6, at which point the second component 3 is coupled to shaft 4 by switching element 5 in a non-rotatable manner.

With the embodiment of device 1 shown in FIG. 3, the toothing profiles 8 and 9 of components 2 and 3 as well as the corresponding areas and teeth rows 10A, 10B and/or 10C and 10D of surrounding areas of toothing profiles 10 are arranged on staggered, radial diameter ranges in order to ensure that device 1 can be mounted successfully. In contrast, toothing profiles 8 and 9 of components 2 and 3 and toothing profile 10 of the switching element 5 are arranged on the same diameter range in the radial direction with the embodiment shown in FIG. 4. In the FIG. 4 embodiment, the toothing profile 8 of the first component 2 is provided in an outer diameter range of a ring-shaped, separate construction element 16, which is connected to the first component 2 in a non-rotatable manner and fixed to component 2 via spring washers 17 and 18 in the axial direction.

Figure 4:
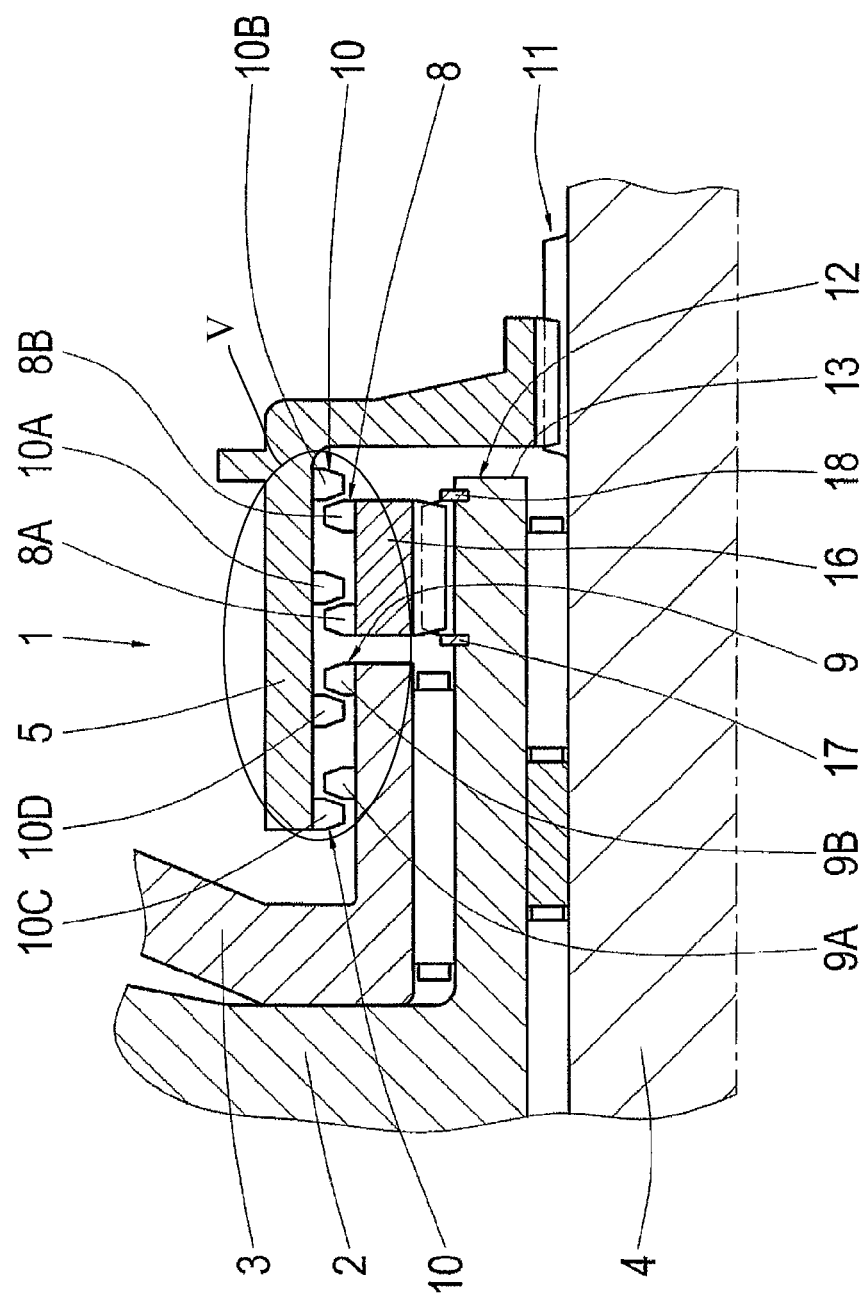
FIG. 4—A second embodiment of the device corresponding to FIG. 3.
Figure 5:
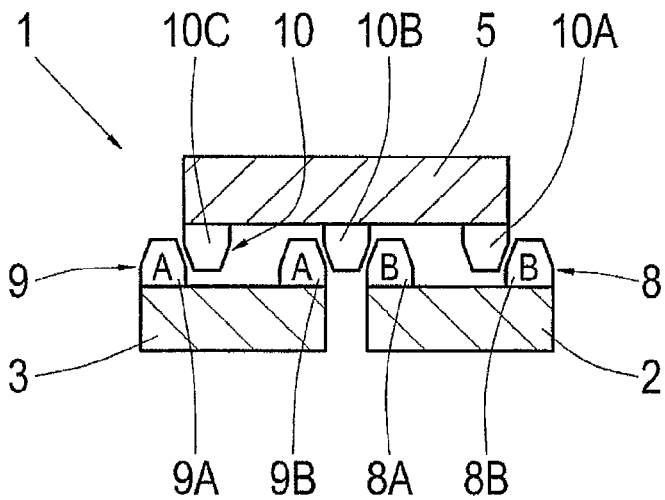
FIG. 5—An enlarged representation of area "V" (indicated as part of FIG. 4) of a third embodiment of the device, in which the switching element and the two components are in an intermediate operating state.
Figure 6:
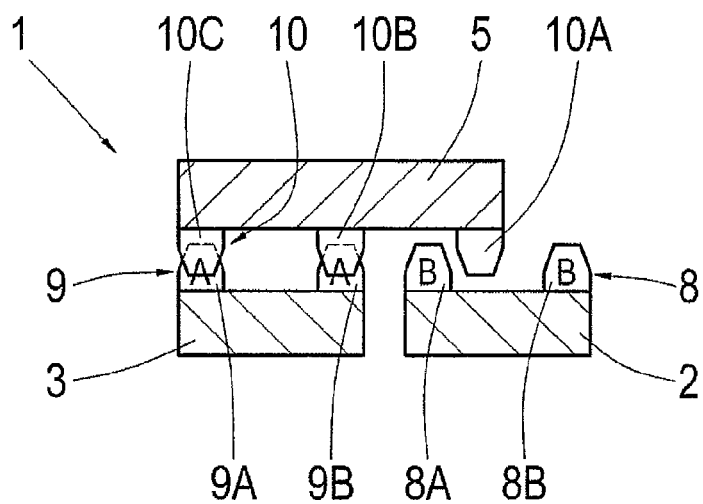
FIG. 6—A representation of the third embodiment of the device corresponding to FIG. 5 with the switching element and the two components in the first operating state.
Figure 7:
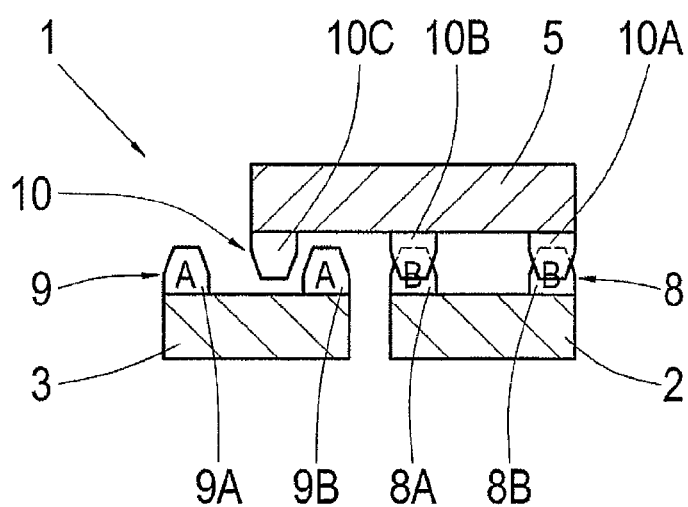
FIG. 7—A representation of the third embodiment of the device corresponding to FIG. 5 with the switching element and the two components in the second operating state.

FIGS. 5 to 7 all show an enlarged view of an area "V" marked in FIG. 4 pertaining to a third embodiment variant of device 1 in which the toothing profiles 8 and 9 of components 2 and 3 are each fitted with two teeth rows 8A and 8B and/or 9A and 9B. In contrast to the two first embodiments of device 1 shown in FIGS. 1 to 4, the toothing profile 10 of the switching element 5 is only fitted with three teeth rows (10A to 10C) for the third embodiment form of device 1 as shown in FIGS. 5 to 7. The teeth rows 10B and 10C each overlap with the teeth rows 9A and 9B of toothing profile 9 of the second component 3 given the second operating state of switching element 5 in the manner shown in FIG. 6 in order to connect the second component 3 with shaft 4 in a non-rotatable manner via switching element 5. In contrast to this, the teeth rows 10A and 10B of switching element 5 engage with and/or overlap with the teeth rows 8A and 8B of the toothing profile 8 of the first component 2 in the first operating state of switching element 5 in order to connect the first component 2 with shaft 4 via switching element 5 in a non-rotatable manner.

The center toothing row 10B of toothing profile 10 of switching element 5 is assigned to both the first component 2 as well as the second component 3, in order to make the design of device 1 in accordance with FIGS. 5 to 7 more space-saving than the variant of device 1 shown in FIGS. 1 to 4. The center toothing row 10B of the switching element 5 is used for both switching positions of switching element 5 by simply arranging toothing rows 8A, 8B and 9A, 9B as well as toothing rows 10A to 10C of switching element 5 in a purposeful manner. The neutral position of the switching element 5 shown in FIG. 5 between the two switching positions of switching element 5 shown in FIGS. 6 and 7 is required as a transitional state due to the fact that the two components 2 and 3 rotate at different speeds under operational conditions and that switching element 5 may therefore not come into contact with both components 2 and 3 at the same time in either operating state. Using the multi-row claw toothing solution shown in FIGS. 5 to 7, the operative connection between the components 2, 3 and shaft 4 can be made or released with just a short switching path and little effort using an electromagnetic actuation solution for the switching element 5.

REFERENCE NUMBERS

1—Device to releasable connect two components and a shaft
2—First component
3—Second component
4—Shaft
5—Switching element
6—Actuator
7—Spring mechanism
8—Toothing profile of the first component
8A, 8B—Teeth row of the first component's toothing profile
9—Toothing profile of the second component
9A, 9B—Teeth row of the second component's toothing profile
10—Toothing profile of the switching element
10A to 10D—Teeth row of the switching element toothing profile
11—First stop
12—Second stop
13—Front surface of the first component
14—Electromagnet of the actuator
15—Permanent magnet of the actuator
16—Construction element
17—Spring washer
18—Spring washer

What is claimed is:

1. A device for releasably connecting a component and a shaft, the device comprising:
   a shaft;
   a first component rotatably mounted on the shaft, wherein the first component has a first toothing profile;
   a second component rotatably mounted on the shaft, wherein the second component has a second toothing profile; and
   a switching element non-rotatably mounted on the shaft, wherein the switching element has a third toothing profile, wherein the switching element may travel in an axial direction of the shaft;
   wherein the switching element can be coupled with one of the first component or the second component through a relative motion between the switching element and one of the first component or the second component, wherein the relative motion is in an axial direction of the shaft;
   wherein the first component is coupled with the switching element when the first toothing profile overlaps the third toothing profile;
   wherein the first component is released from the switching element when the first toothing profile does not overlap the third toothing profile;
   wherein the second component is coupled with the switching element when the second toothing profile overlaps the third toothing profile;
   wherein the second component is released from the switching element when the second toothing profile does not overlap the third toothing profile;
   wherein the switching element has a first operating state in which the first component is coupled with the shaft in a non-rotatable manner via the switching element and the second component is rotatably mounted on the shaft;
   wherein the switching element has a second operating state in which the second component is coupled with the shaft in a non-rotatable manner via the switching element and the first component is rotatably mounted on the shaft;
   wherein the first toothing profile has at least two spaced-apart teeth rows, the second toothing profile has at least two spaced-apart teeth rows, and the third toothing profile has at least three spaced-apart teeth rows;
   wherein at least two of the at least three spaced-apart teeth rows of the third toothing profile can be brought into engagement with the at least two spaced-apart teeth rows of the first toothing profile; and
   wherein at least two of the at least three spaced-apart teeth rows of the third toothing profile can be brought into engagement with the at least two spaced-apart teeth rows of the second toothing profile.

2. The device of claim 1, wherein the distances between the at least two spaced-apart teeth rows of the first toothing profile, the distances between the at least two spaced-apart teeth rows of the second toothing profile, and the distances between the at least three spaced-apart teeth rows of the third toothing profile are arranged such that there is an intermediate operating state as the switching element travels between the first operating state and the second operating state, wherein during the intermediate operating state there is no overlap between the first toothing profile and the third toothing profile or the second toothing profile and the third toothing profile and neither the first component nor the second component are connected with the shaft in a non-rotatable manner via the switching element.

3. The device of claim 1, wherein the first toothing profile is arranged the same radial distance from the shaft as at least some of the third toothing profile and the second toothing profile is arranged the same radial distance from the shaft as at least some of the third toothing profile.

4. The device of claim 3, wherein the first toothing profile is arranged at a different radial distance from the shaft than the second toothing profile.

5. The device of claim 1, wherein at least part of the first toothing profile is arranged next to at least part of the second toothing profile in the axial direction of the shaft.

6. The device of claim 1, wherein the first toothing profile and the second toothing profile are at least partially surrounded in a radial direction from the shaft by the third toothing profile.

7. The device of claim 1, wherein the second component is rotatably mounted on the first component and the first component is rotatably mounted on the shaft.

8. The device of claim 1, wherein the switching element is slidably mounted on the shaft in the axial direction of the shaft between a first stop and a second stop.

9. The device of claim 8, wherein the first stop is located near the shaft.

10. The device of claim 8, wherein the second stop is located near the first component.

11. The device of claim 1, further comprising an actuator configured to move the switching element to the first operating state.

12. The device of claim 11, further comprising a spring device configured to move the switching element to the second operating state.

13. The device of claim 12, wherein the actuator comprises an electromagnet and a permanent magnet;
   wherein a positive current flow causes the electromagnet to increase the magnetic field of the permanent magnet such that the switching element may move toward the first operating state in opposition to a spring force of the spring device;
   wherein a negative current flow causes the electromagnet to decrease the magnetic field of the permanent magnet such that the switching element may move toward the second operating state in opposition to a magnetic force of the actuator.

14. The device of claim 13, wherein the switching element can remain in the first operating state by means of the permanent magnet in a de-energized condition.

15. The device of claim 13, wherein the switching element can remain in the second operating state by means of the spring device without powering the electromagnet.

16. The device of claim 1, further comprising a construction element non-rotatably connected to the first component, wherein the first toothing profile is arranged on the construction element.

17. The device of claim 1, wherein a center teeth row of the at least three spaced-apart teeth rows of the third toothing profile can be brought into engagement with both the first toothing profile and the second toothing profile.

18. A switching element for releasably connecting a component and a shaft, the switching element comprising:
   a switching element toothing profile capable of engaging a toothing profile of a first component rotatably mounted on the shaft and engaging a toothing profile of a second component rotatably mounted on the shaft;
   wherein the switching element is designed to be non-rotatably mounted on the shaft and is designed to travel in an axial direction of the shaft;
   wherein the switching element can be coupled with one of the first component or the second component through a relative motion between the switching element and one of the first component or the second component, wherein the relative motion is in an axial direction of the shaft;
   wherein the switching element has a first operating state in which the first component is coupled with the shaft in a non-rotatable manner by the switching element toothing profile engaging the first component toothing profile;
   wherein the switching element has a second operating state in which the second component is coupled with the shaft in a non-rotatable manner by the switching element toothing profile engaging the second component toothing profile;
   wherein the first component toothing profile has at least two spaced-apart teeth rows, the second component toothing profile has at least two spaced-apart teeth rows, and the switching element toothing profile has at least three spaced-apart teeth rows;
   wherein at least two of the at least three spaced-apart teeth rows of the switching element toothing profile can be brought into engagement with the at least two spaced-apart teeth rows of the first component toothing profile; and
   wherein at least two of the at least three spaced-apart teeth rows of the switching element toothing profile can be brought into engagement with the at least two spaced-apart teeth rows of the second component toothing profile.

* * * * *